United States Patent
Delgado Gimón et al.

(10) Patent No.: US 11,904,775 B2
(45) Date of Patent: Feb. 20, 2024

(54) INDIRECT VISION DEVICE

(71) Applicant: FicoMirrors, S.A.U., Barcelona (ES)

(72) Inventors: Verónica Delgado Gimón, Viladecavalls (ES); Marc Vallés Hernández, Viladecavalls (ES); Néstor Ruiz Ortega, Viladecavalls (ES); María Luisa Novella Requena, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 0 days.

(21) Appl. No.: 18/157,292

(22) Filed: Jan. 20, 2023

(65) Prior Publication Data
US 2023/0234508 A1    Jul. 27, 2023

(30) Foreign Application Priority Data
Jan. 24, 2022    (EP) .................................... 22382051

(51) Int. Cl.
| | |
|---|---|
| *B60R 1/12* | (2006.01) |
| *F21S 43/237* | (2018.01) |
| *F21S 43/14* | (2018.01) |
| *F21Y 115/10* | (2016.01) |
| *F21W 103/25* | (2018.01) |

(52) U.S. Cl.
CPC ............ *B60R 1/1207* (2013.01); *F21S 43/14* (2018.01); *F21S 43/237* (2018.01); *F21W 2103/25* (2018.01); *F21Y 2115/10* (2016.08)

(58) Field of Classification Search
CPC ........ F21S 43/237; F21S 43/14; B60R 1/1207
See application file for complete search history.

(56) References Cited

U.S. PATENT DOCUMENTS

| 10,746,575 B2 | 8/2020 | Kennedy |
| 2010/0132232 A1 | 6/2010 | Frisch |

(Continued)

FOREIGN PATENT DOCUMENTS

| DE | 102019210283 A1 | 2/2020 |
| EP | 2796322 A1 | 10/2014 |

(Continued)

OTHER PUBLICATIONS

European Application No. 22382051.5 filed Jan. 24, 2022; European Office Action dated Jun. 22, 2022; 8 pages.

*Primary Examiner* — Christopher E Dunay

(74) *Attorney, Agent, or Firm* — CANTOR COLBURN LLP

(57) ABSTRACT

The present invention refers to an indirect vision device for vehicles integrating a lighting unit, like light indicators or light decorative elements, preferably for vehicles. The lighting device (1) comprises: a light source (2), a light guide (5) for guiding light emitted by the light source (2). The light guide (5) comprises a light guide material and scattering particles (10) admixed therein, and the refractive index of the scattering particles (10) is different than the refractive index of the light guide matrix material, such that light guided by the light guide (5), can be scattered by the scattering particles (10) out of the light guide (5). The invention provides an indirect vision device with enhanced homogeneous luminance and increased luminance.

15 Claims, 3 Drawing Sheets

(56) References Cited

U.S. PATENT DOCUMENTS

| | | | |
|---|---|---|---|
| 2012/0170305 A1* | 7/2012 | Rudek | G02B 6/001 |
| | | | 362/581 |
| 2013/0329444 A1* | 12/2013 | Oh | F21S 43/195 |
| | | | 362/543 |
| 2017/0197542 A1* | 7/2017 | Belcher | G02B 6/005 |
| 2018/0149330 A1* | 5/2018 | Gloss | G02B 6/0055 |
| 2019/0093849 A1* | 3/2019 | Belcher | F21S 43/245 |
| 2020/0109834 A1 | 4/2020 | John et al. | |
| 2020/0189471 A1* | 6/2020 | Horne | F21S 43/19 |
| 2021/0063624 A1* | 3/2021 | Kappel | G02B 6/06 |

FOREIGN PATENT DOCUMENTS

| | | |
|---|---|---|
| EP | 3712969 A1 | 9/2020 |
| JP | 2015041466 A | 3/2015 |

\* cited by examiner

INDIRECT VISION DEVICE

CROSS-REFERENCE TO RELATED APPLICATIONS

This application claims the benefit of European Application Serial No. 22382051.5 filed Jan. 24, 2022, the disclosure of which is incorporated herein by reference in its entirety.

BACKGROUND

The present invention refers in general to indirect vision devices integrating a lighting device for a vehicle, like rear-view mirrors for vehicles, exterior winglets with a camera, with or without a mirror.

An object of the invention is to provide an indirect vision device with enhanced homogeneous luminance.

An additional object of the invention is to provide an indirect vision device, that features increased luminance with a reduced number of light sources or with reduced light source power.

Indirect vision devices for vehicles are conventionally provided with lighting devices as indicators like: direction indicators, usually referred as blinkers, which emit light flashes in order to indicate a change in the direction of travel, day-light devices, puddle lamps, etc. Said lighting devices are arranged in different surfaces of the indirect vision device.

Such lighting devices conventionally comprise a light source and a light guide to guide the light emitted by the light source, and strips or prisms as light refraction means, to direct light out of the light guide through a lateral surface of the light guide, such that the entire body of the light guide is illuminated using a localized light source in at least one of its ends.

A known drawback associated with light refractive strips or prisms, is the low luminance caused by light escaping in between the strips or prims. In addition, in the space between consecutive strips, the light guide emits no light or practically negligible light, which means that from a close up observation of the light guide, the appearance of the different light emitting focus is not homogeneous.

An additional drawback of light guides having several strips, is that their design and fabrication is complicated and expensive. Furthermore, from a lighting engineering point of view, as each strip or prism behaves as an individual light source, the light radiation of the lighting device is the sum of all the individual light sources, so that the visual effect caused, is the one of a plurality of discrete lights, instead of a homogeneous radiation.

SUMMARY

As aspect of the invention refers to an indirect vision device comprising a lighting device, preferably a lighting device adapted to operate as a light indicator or decorative light device for vehicles.

The lighting device comprises a light source, and a light guide for guiding light emitted by the light source, that is, the light source and the light guide are arranged relative to each other, such that light emitted by the light source is guided along the light guide and emitted through at least a lateral surface of the light guide.

The light guide is made of a matrix of transparent or translucent material. Preferably it is made of a light-diffusive plastic material like Polymethyl methacrylate (PMMA).

According to the invention, the light guide has scattering particles embedded therein, and the light guide is done by admixing scattering particles to the plastic matrix. The refractive index of the scattering particles and the plastic matrix are different.

Preferably, the color of scattering particles is the same or similar (for example same color but lighter or darker) than the color of the matrix material, such that, when viewed externally, the entire body of the light guide or most of it, has an homogeneous appearance and color, that is, the scattering particles are hardly visible or are invisible to the naked eye of an user.

Due to the scattering particles admixing in the matrix, light guided by the light guide, when the light source is emitting light, is scattered by the scattering particles in different directions, and out of the light guide, through at least a side surface of the light guide.

The provision of a light guide with scattering particles embedded therein as described above, improves light homogeneity of the body of the light guide.

For the present disclosure, light refractive index can be measured using any known and conventional measuring method, making the measurement, for example, at the widely used wavelength at the Sodium D-line, 589 nm, at 20° C.

Preferably, the light guide is a monolithic body having the scattering particles embedded therein, such that the use reflective strip or prisms is avoided.

The light guide is obtained by extrusion or injection moulding with a plastic matrix material having the scattering particles immersed therein, so that the particles are co-extruded or co-injected with the matrix material. For example, the scattering particles can be mixed with the plastic matrix material in a molten state prior extrusion. The invention also involves other manufacturing methods like 3D printing.

Furthermore, the lighting device comprises a back housing having an outer surface and an inner surface which is preferably, at least in part, a light reflective surface. The light guide is placed on or above the back housing's inner surface, such that light scattered out of the light guide is in turn reflected by the back housing's inner surface.

Reflection of light towards the lighting device exterior due to the back housing's inner reflective surface, increases light luminance of the device, which in combination with the light homogeneity feature mentioned above, provides a lighting device with higher luminance and a better homogeneity along the whole light guide, in turn increasing luminance.

Preferably, the back housing's light reflective surface is white, and with a reflection value higher than 4%.

The concentration of scattering particles in the light guide, is within the range 0.01% to 50% in weight of the light guide material.

Preferably, the size of the scattering particles is less than 50 μm. This means that the maximum size that can be measured in a particle, is less than 50 μm.

In a preferred embodiment, the light guide is an elongated body having at least two ends and a side surface extending from the at least one end to the other end, and the light travels along the elongated body and as light contacts with the scattered particles the light is scattered out of the guide light through its side surface. Preferably, the light source is arranged to emit light into one end of the light guide.

In addition, the lighting device comprises a printed circuit board (PCB). Preferably, having a light reflective surface, for example a white surface, and the light source (i.e. one or more LED lights) is mounted in the PCB and above the light reflective surface, such that light emitted by the light source in the direction of the reflective surface of PCB, as well as light reflected by the light guide towards the reflective surface of the PCB, is reflected by the light reflective surface of the printed circuit board, so as to further improve luminance homogeneity of the device and improving exit of the light of the lighting device.

In a preferred embodiment, the lighting device includes a translucent cover, coupled with the back housing to configure together a housing, and the light guide is housed in the housing, such that, when the light source is emitting light, light reflected by the back housing's inner light reflective surface, is reflected back and passes through the translucent cover out of the device.

Furthermore, the light guide is arranged relative to the translucent or transparent cover, in a way that, at least 30% and preferably at least 50% of a light path defined by the light guide to guide light, is parallel to the translucent or transparent cover.

In an alternative embodiment, the light guide and the translucent cover are formed as a unitary body, which configure the housing of the device together with the back housing.

The indirect vision device is a rear-view mirror or a winglet for vehicles, and the lighting device is a light indicator, preferably a blinker.

BRIEF DESCRIPTION OF THE DRAWINGS

Preferred embodiments of the invention are henceforth described with reference to the accompanying drawings, wherein.

DETAILED DESCRIPTION

Figure 1A:
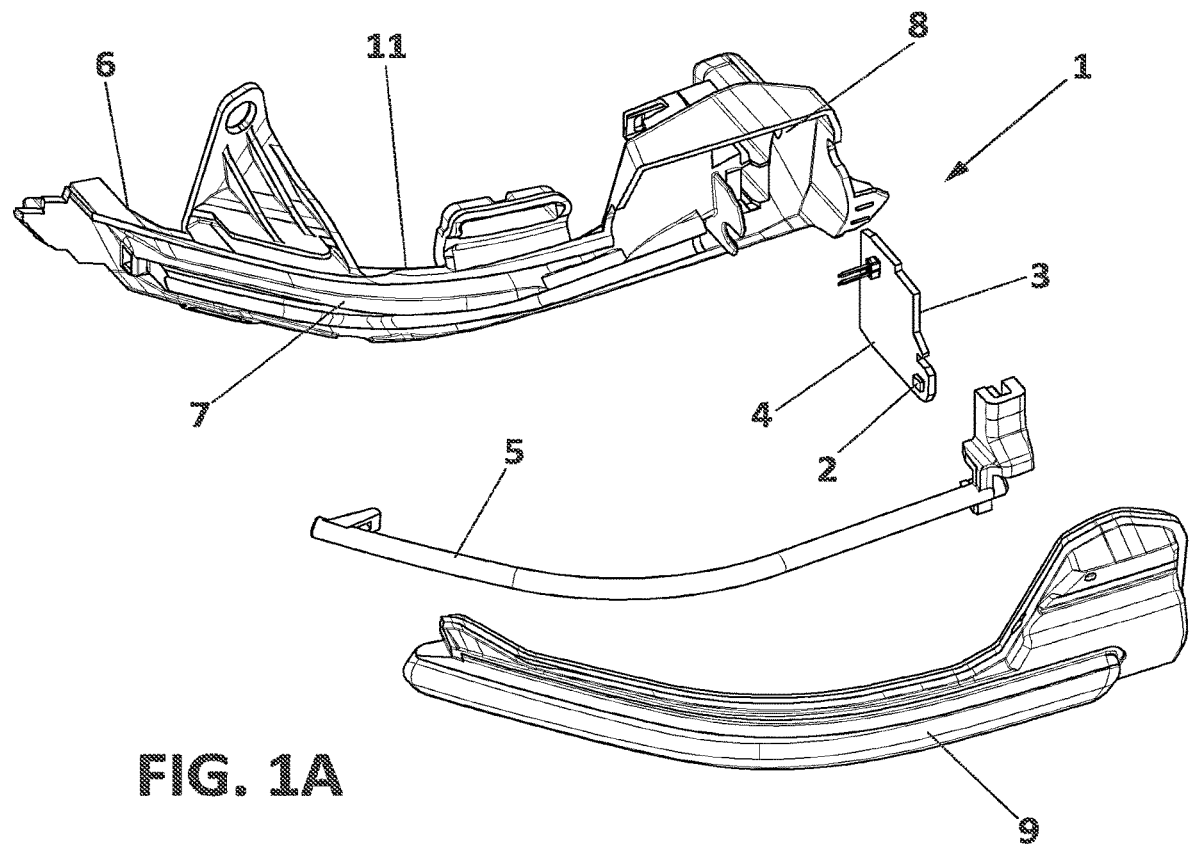
FIG. 1A depicts an exploded view of a preferred embodiment of the invention in which the translucent cover and the light guide are separated bodies, and translucent cover protects the light guide.
Figure 1B:
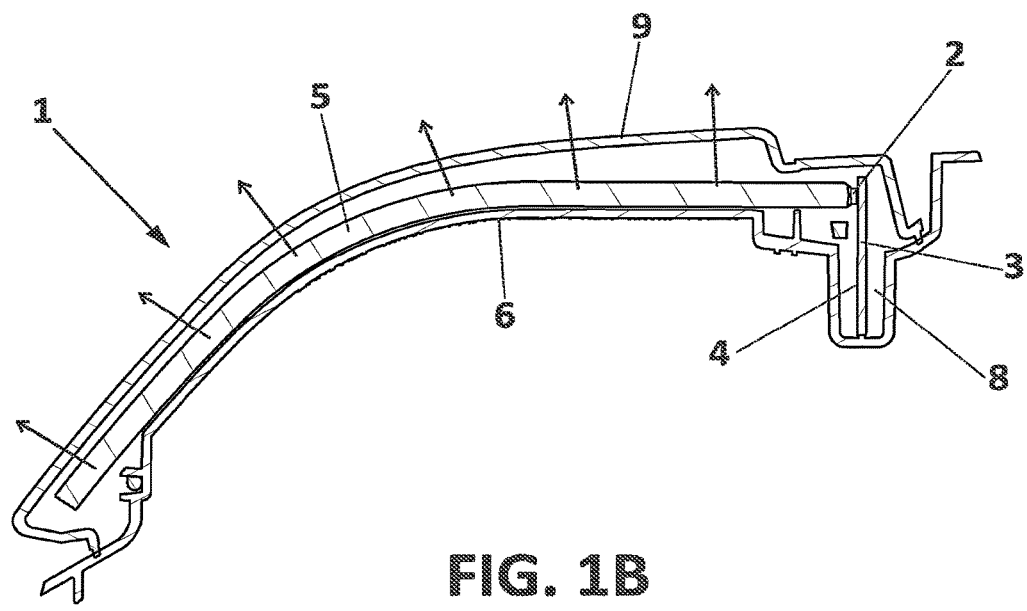
FIG. 1B shows a cross-section view of the preferred embodiment of the invention with the arrows in FIG. 1B indicating light leaving the lighting device through the translucent cover.

In the embodiment of FIGS. 1A,1B according to the invention, the lighting device (1) includes a translucent cover (9) coupled with a back housing (6) to configure a housing, and a light guide (5) is housed in the housing. The translucent cover (9) and the back housing (6) have a complementary configuration to be coupled with each other, and the back housing (6) is configured to be attached to an indirect vision device.

In this embodiment, the light guide (5) is an elongated body, in particular it is a rod shaped and curved body having two ends (5a,5b) and a side surface (5c) extending from the at least one end (5a) to the other end (5b).

The back housing (6) has an outer surface (11) and an inner surface (7). The inner surface (7) facing the light guide (5), is formed with light colors material, preferably with reflective properties, for example this light reflective surface is white, with a reflection value higher than 4%.

The light guide (5) is placed above the inner surface (7), such that light reflected by the inner light reflective surface (7) pass through the translucent cover (9), when the light source (2) is emitting light.

In FIG. 1B it can be noted that at least 30% of a light path defined by the light guide (5) to guide light, is substantially parallel to a part of the translucent cover (9).

Furthermore, the lighting device (1) comprises: a light source (2) typically one or more LED's, mounted on a printed circuit board (3), and arranged to emit light into the light guide, for example, into one end (5a) of the light guide (5), such that light emitted by the light source (2) is guided from one end (5a) to the other end (5b) of the light guide (5) along the light guide (5).

The printed circuit board (3) has a light reflective surface (4) and the light source (2) is placed above the light reflective surface (4), such that a portion of light of the light source (2) that impinges on the light reflective surface (4) is reflected thereon.

Figure 3:
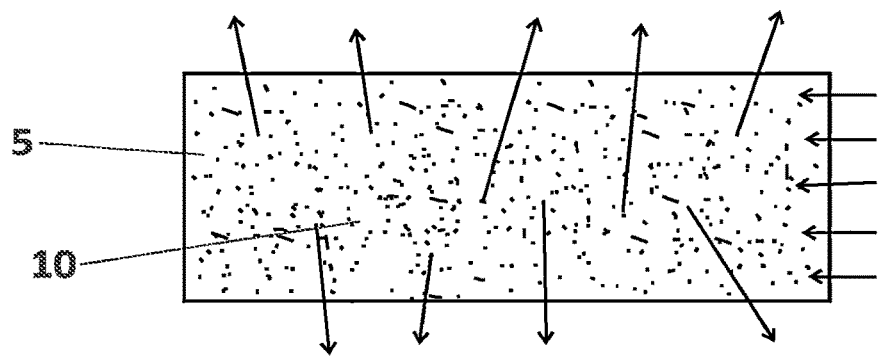
FIG. 3 shows an enlarged view of a section of a light guide with matrix material and scattering particles admixed, wherein the arrows illustrate light reflected by the scattering particles. The particles are represented for the sake of the illustration, but these are not visible to the naked eye.

The plastic matrix of the light guide (5) has scattering particles (10) embedded therein, and the refractive index of the scattering particles (10) is different than the refractive index of the matrix material, such that light guided along the light guide (5), can be scattered by the scattering particles (10) out of the light guide (5) through a lateral surface of the light guide, as shown in FIG. 3.

In addition, part of light from the light guide (5) that impinges on the light reflective surface (4) of the printed circuit board (3), is reflected thereon.

The scattering particles (10) might have all the same color, and preferably the same color of the light guide matrix material. Alternatively, particles of different color are provided in the light guide matrix (5).

The scattering particles (10) might have different shapes, but preferably the particles are generally spherical, and they are made of a plastic material. The average size of the scattering particles (10) is less than 50 μm.

The light guide matrix (5) is manufactured with a plastic transparent or translucent material, for example, featuring light diffusive properties, for example PMMA.

The light guide (5) is a unitary one piece body, obtained by injection-molding, extrusion or 3D printing.

The back housing (6) has a receptable (8) for receiving and fixing the printed circuit board (3). Alternatively, the light guide (5) or the back housing (6) and the light guide in combination configure a receptacle for receiving the printed circuit board (3). When the lighting device (1) is assembled, the printed circuit board (3) and the light source (2) are placed adjacent one end (5a) of the light guide (5) as to emit light into the light guide (5).

Alternatively, the light guide (5) and the light source (2) are configured in a way that light is emitted into the light guide (5) at a part of the same located in any part along the light guide (5).

Figure 4A:
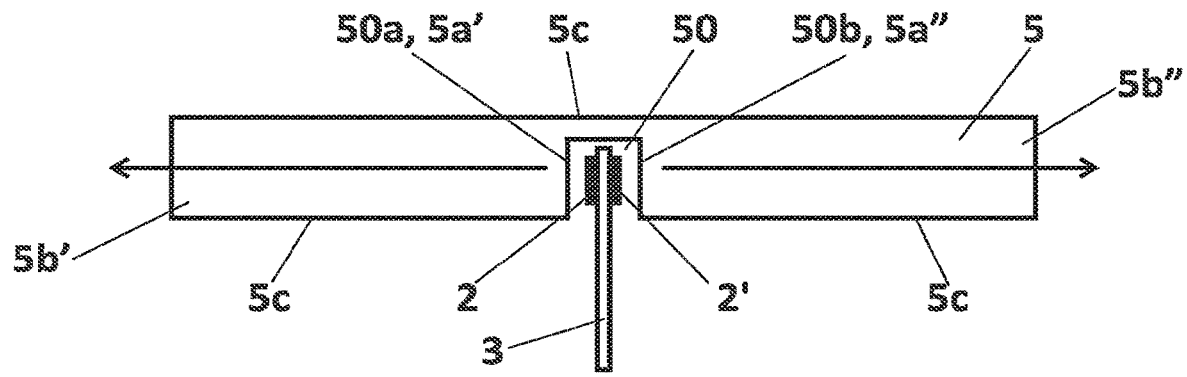
FIG. 4A depicts a schematic representations of an alternative design of the light guide and alternative positions of the light source.

In the exemplary embodiment of FIG. 4A, the light guide (5) has a recess or cavity (50) at a middle part thereof, and the printed circuit board (3) has two light sources (2,2') mounted at opposite sides of printed circuit board (3). The two light sources (2,2') are placed inside the recess (50) acting as one end (5a',5a") of the light guide (5) so that one of the light sources emits light from inside the light guide and towards one of its ends (5b'), and the other light source emits light from inside the light guide (5) and towards the other end (5b") of the same. For that, the recess (1) has two surfaces (50a,50b) facing each other and facing one of the light sources (2,2').

Figure 4B:
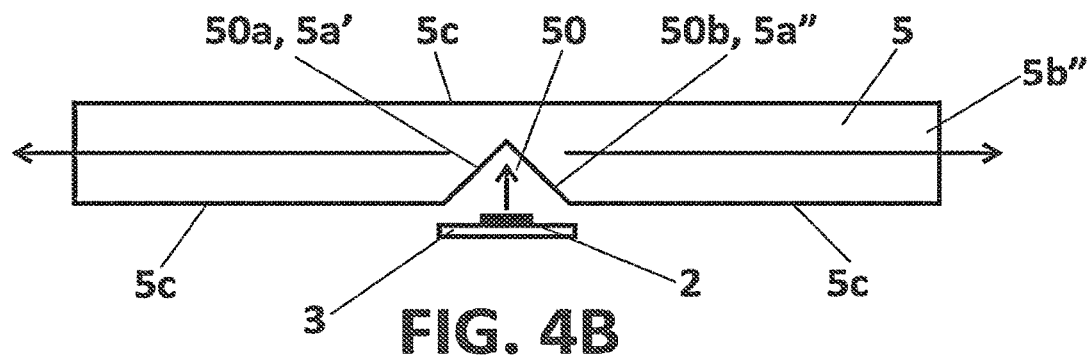
FIG. 4B depicts a schematic representations of another alternative design of the light guide and alternative positions of the light source.

The embodiment of FIG. 4B is similar to the one of FIG. 4A, but there is only one light source (2) mounted on the printed circuit board (3) and placed outside the light guide (5). The light guide (5) also has a recess (50) having two surfaces (50a,50b) that are inclined in relation to each other and each one acting as one end (5a',5a"). The light source (2) emits light towards these two surfaces (50a,50b), such that one of the surfaces redirects light towards one end (5b') of the light guide (5), and the other surface redirect light towards the other end (5b").

Figure 4C:
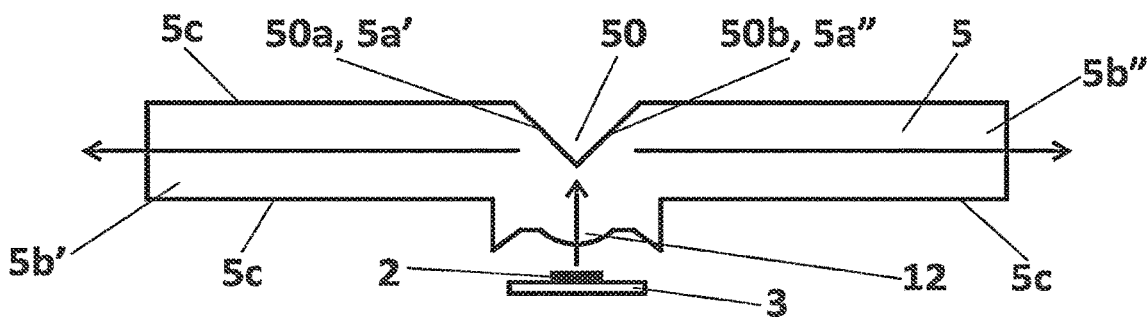
FIG. 4C depicts a schematic representations of yet another alternative design of the light guide and alternative positions of the light source.

In the embodiment of FIG. 4C, the light guide (5) has a lens (12) on its side surface (5c) and a recess (50) having two surfaces (50a,50b). There is only one light source (2) placed outside the light guide (5), and arranged to emit light towards the lens (12). The lens (12) and the surfaces (50a,50b) are configured and arranged relative to each other, in a way that the lens (12) directs light from the light source (2) to the surfaces (50a,50b) acting as ends (5a',5a") of the light guide (5), and these surfaces (50a,50b) in turn redirect light towards the two ends (5b',5b") of the light guide (5).

In the embodiments of FIGS. 4A, 4B and 4C, the light guide (5) is represented as a straight body, but it is understood that the light guide (5) could has other configurations, for example a curved geometry.

Figure 2A:
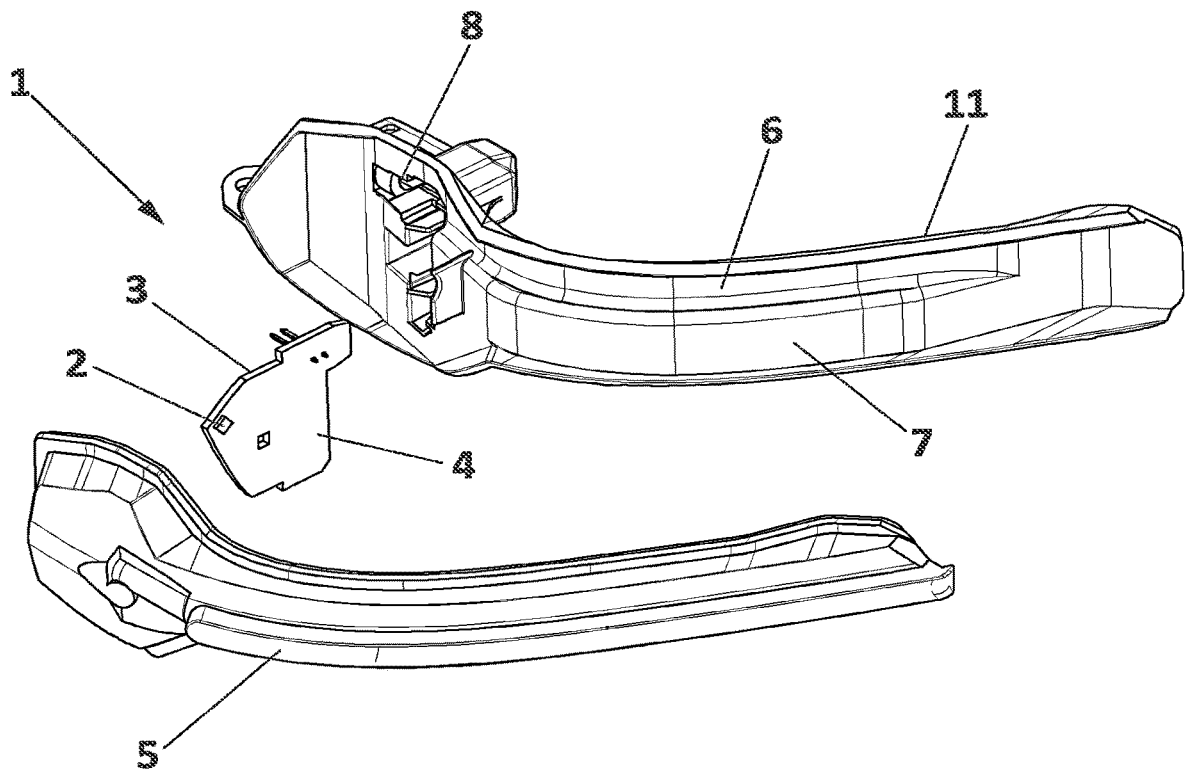
FIG. 2A depicts an exploded view of an alternative embodiment of the invention, in which the translucent cover and the light guide are integrated as a single body.
Figure 2B:
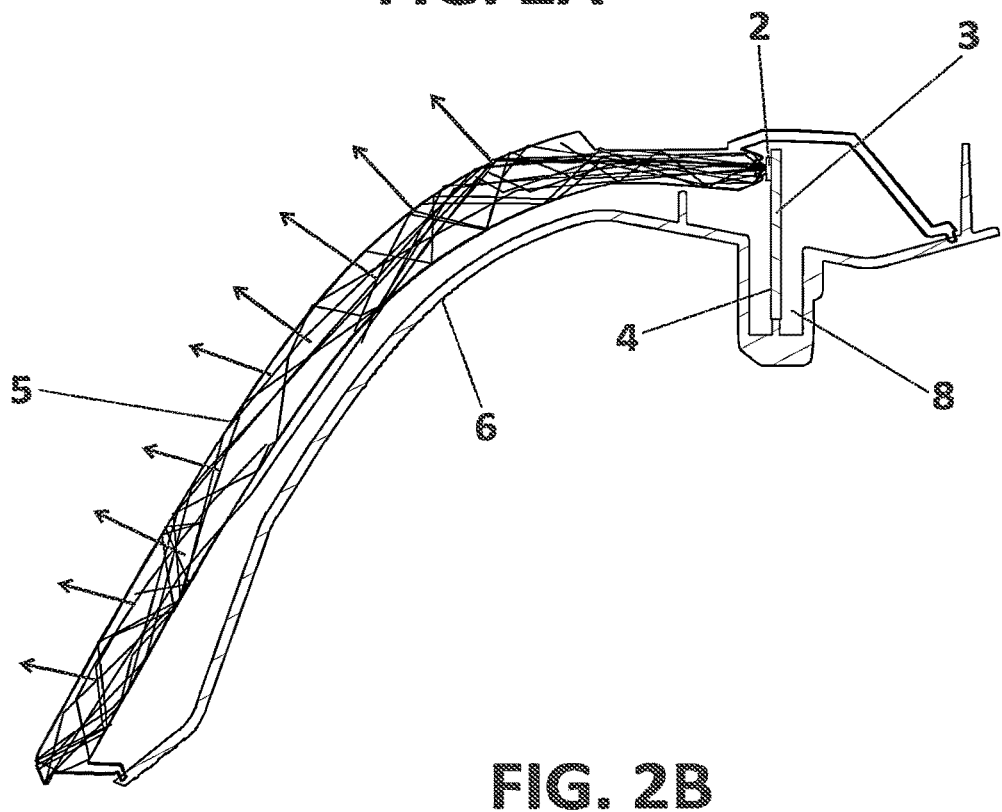
FIG. 2B depicts a cross-sectional view of the alternative embodiment of FIG. 1A in which the arrows indicate light exiting from the lighting device, light from the light guide or the reflected light from the interior wall of the back housing.

In the alternative embodiment of FIGS. 2A,2B, the light guide (5) is integrated in the translucent cover (9), such that light guide (5) and the translucent cover (9) are formed as a unitary body.

As represented in the figures, the outer surface of the light guide (5) is generally smooth, so that the light guide (5) is a stripless and prismless body, that is, the light guide (5) has no prism or strips to reflect light out of the light guide (5). Other preferred embodiments of the present invention are described in the appended dependent claims and the multiple combinations of those claims.

What is claimed is:

1. An indirect vision device for vehicles comprising a lighting device (1), the lighting device comprising:
    a light source (2),
    a light guide (5) for guiding light emitted by the light source (2),
    wherein the light guide (5) is made of a matrix of transparent or translucent material, wherein the light guide (5) is an elongated body having two ends and a side surface extending from one end to the other end,
    wherein the light source (2) is arranged to emit light into the light guide (5), such that light emitted by the light source (2) is guided along the light guide (5) when the light source (2) is emitting light,
    a back housing (6) formed from a material defining an outer surface (11) and a white inner surface (7), wherein the light guide (5) is spaced from the back housing (6) inner surface,
    wherein the light guide (5) has scattering particles (10) admixed therein, and wherein the refractive index of the scattering particles (10) is different than the refractive index of the light guide matrix material, such that light guided by the light guide (5), is scattered by the scattering particles (10) out of the light guide (5) through a side surface of the light guide (5) when the light source (2) is emitting light; and
    wherein the lighting device is configured to be mounted in a vehicle.

2. The indirect vision device according to claim 1, wherein the inner surface (7) of the back housing (6) is, at least partially, a light reflective surface.

3. The indirect vision device according to claim 2, wherein back housing's white inner surface (7) has a reflection value higher than 4%.

4. The indirect vision device according to claim 1, wherein the scattering particles (10) in the light guide material has a concentration within a range of 0.01% to 50% in weight of the light guide material.

5. The indirect vision device according claim 1, wherein the scattering particles (10) have a size that is less than 50 µm.

6. The indirect vision device according to claim 1, further comprising a printed circuit board (3) having a light reflective surface (4), wherein the light source (2) is mounted on the printed circuit board (3) and on the light reflective surface (4), such that a portion of the light emitted by the light source (2), can be reflected by the light reflective surface (4) of the printed circuit board (3).

7. The indirect vision device according to claim 1, further comprising a translucent cover (9) coupled with the back housing (6) to configure a housing, and wherein the light guide (5) is housed in the housing, such that light emitted by the light guide (5) through its side surface pass through the translucent cover (9) when the light source (2) is emitting light.

8. The indirect vision device according to claim 1, wherein the light guide (5) is a monolithic body.

9. The indirect vision device according to claim 7, wherein the light guide (5) and the translucent cover (9) are formed as a unitary body.

10. The indirect vision device according to claim 1, wherein the light guide (5) is formed by one of an extrusion process and an injection molding process using a light-diffusive plastic material.

11. The indirect vision device according to claim 1, wherein the scattering particles (10) have the same color as the light guide matrix material.

12. The indirect vision device according to claim 1, wherein the light guide (5) is rod shaped.

13. The indirect vision device according to claim 1, wherein the light source (2) comprises at least one LED.

14. The indirect vision device according to claim 1, wherein the outer surface of the light guide (5) is generally smooth, so that the light guide (5) is a stripless and/or prismless body.

15. The indirect vision device according to claim 1, wherein the indirect vision device is a rear-view mirror or a winglet for vehicles, and the lighting device (1) is a light indicator, preferably a blinker.

* * * * *